(12) United States Patent
Jaradi et al.

(10) Patent No.: US 11,541,840 B2
(45) Date of Patent: Jan. 3, 2023

(54) SIDE AIRBAG ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/038,274

(22) Filed: Sep. 30, 2020

(65) Prior Publication Data

US 2022/0097644 A1 Mar. 31, 2022

(51) Int. Cl.
| | |
|---|---|
| *B60R 21/231* | (2011.01) |
| *B60R 21/207* | (2006.01) |
| *B60R 21/2338* | (2011.01) |
| *B60R 21/264* | (2006.01) |
| *B60R 21/2165* | (2011.01) |
| *B60R 21/013* | (2006.01) |
| *B60R 21/01* | (2006.01) |
| *B60R 21/16* | (2006.01) |

(52) U.S. Cl.
CPC ...... *B60R 21/23138* (2013.01); *B60R 21/013* (2013.01); *B60R 21/207* (2013.01); *B60R 21/2165* (2013.01); *B60R 21/2338* (2013.01); *B60R 21/264* (2013.01); *B60R 2021/01286* (2013.01); *B60R 2021/161* (2013.01); *B60R 2021/23146* (2013.01); *B60R 2021/23386* (2013.01)

(58) Field of Classification Search
None
See application file for complete search history.

(56) References Cited

U.S. PATENT DOCUMENTS

| | | | | |
|---|---|---|---|---|
| 5,730,458 | A | * | 3/1998 | Byon ...................... B60R 19/00 280/730.2 |
| 7,874,578 | B2 | | 1/2011 | Thomas et al. |
| 7,931,294 | B2 | | 4/2011 | Okada et al. |
| 10,343,644 | B2 | * | 7/2019 | Dry ..................... B60R 21/2334 |
| 10,501,041 | B2 | | 12/2019 | Faruque et al. |
| 10,569,732 | B2 | * | 2/2020 | Nagasawa ............. B60R 21/207 |
| 10,814,818 | B2 | * | 10/2020 | Dry ....................... B60R 21/217 |
| 2021/0402948 | A1 | * | 12/2021 | Kang .................... B60R 21/207 |

FOREIGN PATENT DOCUMENTS

| | | | | | |
|---|---|---|---|---|---|
| FR | 2788738 | A1 | * | 7/2000 | ............ B60R 21/16 |
| GB | 2322338 | A | * | 8/1998 | ....... B60R 21/23138 |
| WO | 200144026 | A1 | | 6/2001 | |
| WO | 2010121091 | A1 | | 10/2010 | |

* cited by examiner

*Primary Examiner* — Faye M Fleming (74) *Attorney, Agent, or Firm* — Frank A. MacKenzie; Bejin Bieneman PLC (57) ABSTRACT

A restraint system includes a seat and a linear guide adjacent the seat. The linear guide has a base fixed relative to the seat and a lifter moveable relative to the base. An airbag has a mounting connection. The mounting connection is supported by and fixed to the lifter of the linear guide.

18 Claims, 7 Drawing Sheets

SIDE AIRBAG ASSEMBLY

BACKGROUND

Vehicles are typically equipped with airbags. In the event of an impact, inflators activate and provide inflation medium to the airbags, and the airbags pressurize and act as supplemental restraints for occupants during the impact. The airbags are located at various fixed positions in passenger cabins of vehicles. Vehicles typically include a driver airbag mounted in the steering wheel, a passenger airbag mounted in the top of the dash in a vehicle-forward direction from the front passenger seat, and side curtain airbags mounted in the roof rails above the doors.

DETAILED DESCRIPTION

A restraint system includes a seat and a linear guide adjacent the seat. The linear guide includes a base fixed relative to the seat and a lifter moveable relative to the base. An airbag has a mounting connection. The mounting connection is supported by and fixed to the lifter of the linear guide.

The seat may define a vertical axis. The lifter may be moveable relative to the base along the vertical axis.

The linear guide may be configured to restrict movement of the lifter transverse to the vertical axis.

The restraint system may include a pyrotechnic actuator supported by the seat and engaged with the lifter. The pyrotechnic actuator may be positioned to move the lifter upwardly relative to the seat from an undeployed position to a deployed position.

The restraint system may include a processor and a memory storing instructions to actuate the pyrotechnic actuator in response to detecting a vehicle impact.

The seat may include a seat bottom having a top and a bottom spaced from the top. The lifter may be disposed between the top and the bottom in an undeployed position and a deployed position.

The linear guide may be telescopic.

The seat may include a seatback defining an occupant seating area. The airbag may extend from the lifter along the occupant seating area in an inflated position.

The restraint system may include a plurality of external tethers extending from the lifter to the seat.

The seat may include a seat bottom and a seatback supported by the seat bottom. The external tethers may extend along the seat bottom and the seatback when the airbag is uninflated.

The external tethers may be attached to the seat and the lifter. The external tethers may be under tension between the seat and the lifter when the airbag is in an inflated position.

The airbag in an inflated position may be disposed between the external tethers and the seat.

The external tethers may be a reaction surface for the airbag in an inflated position.

The external tethers may be fabric.

The external tethers may be uninflatable.

The linear guide may be supported by the seat.

The restraint system may include a cover supported by the seat. The cover may enclose the lifter and the base.

The cover may include a slit disposed adjacent to the airbag. The airbag may extend through the slit in an inflated position.

The cover may be disposed alongside the seat.

The restraint system may include an inflator in fluid communication with the airbag. The cover may enclose the inflator.

With reference to the Figures, wherein like numerals indicate like parts throughout the several views, a vehicle 10 is generally shown. The vehicle 10 includes a restraint system 12 having a seat 14 and a linear guide 16 adjacent the seat 14. The linear guide 16 includes a base 18 fixed relative to the seat 14 and a lifter 20 moveable relative to the base 18. An airbag 22 includes a mounting connection 24. The mounting connection 24 is supported by and fixed to the lifter 20 of the linear guide 16.

Figure 1:
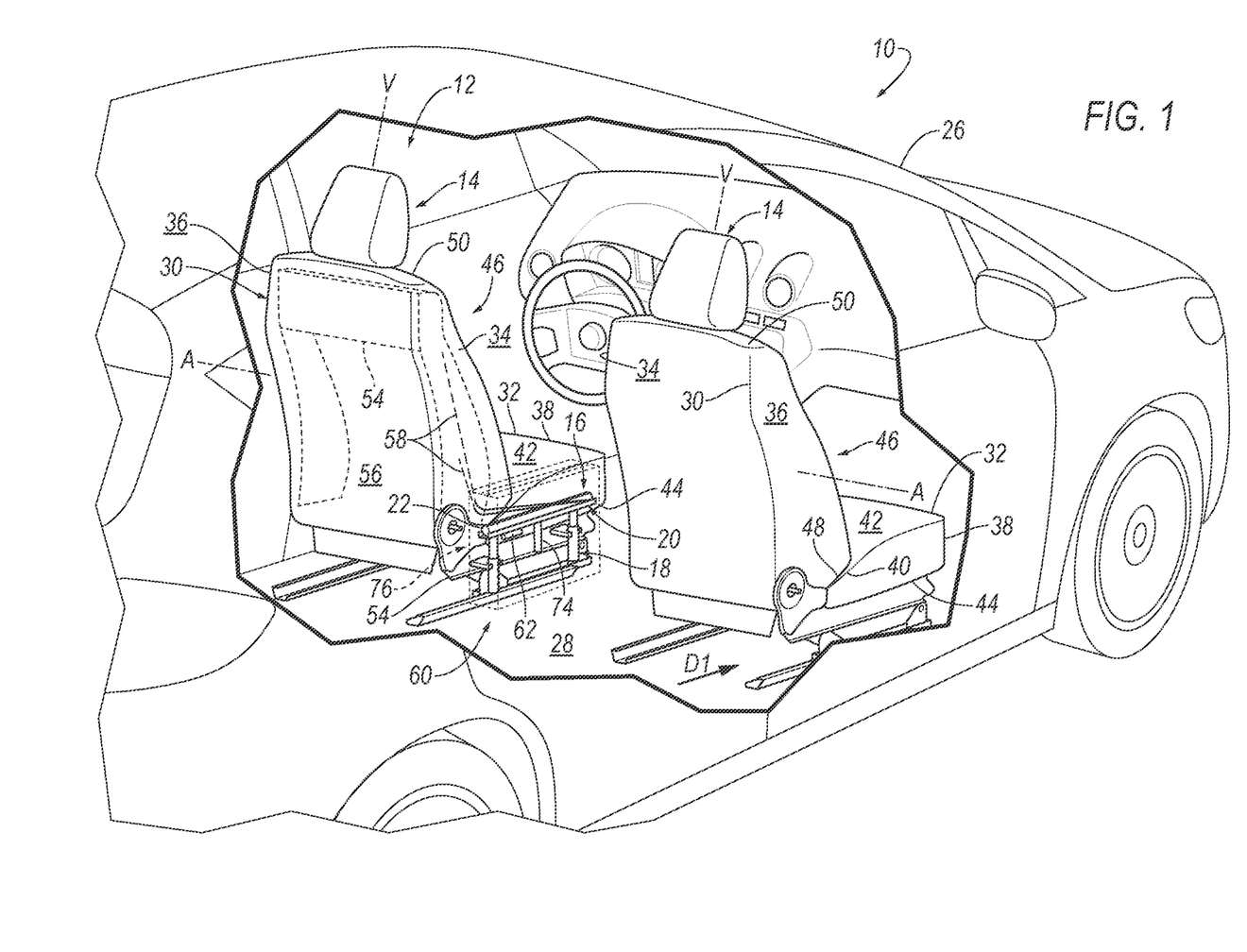
FIG. 1 is a perspective view of a vehicle including a restraint system having an airbag in an uninflated position.
Figure 2:
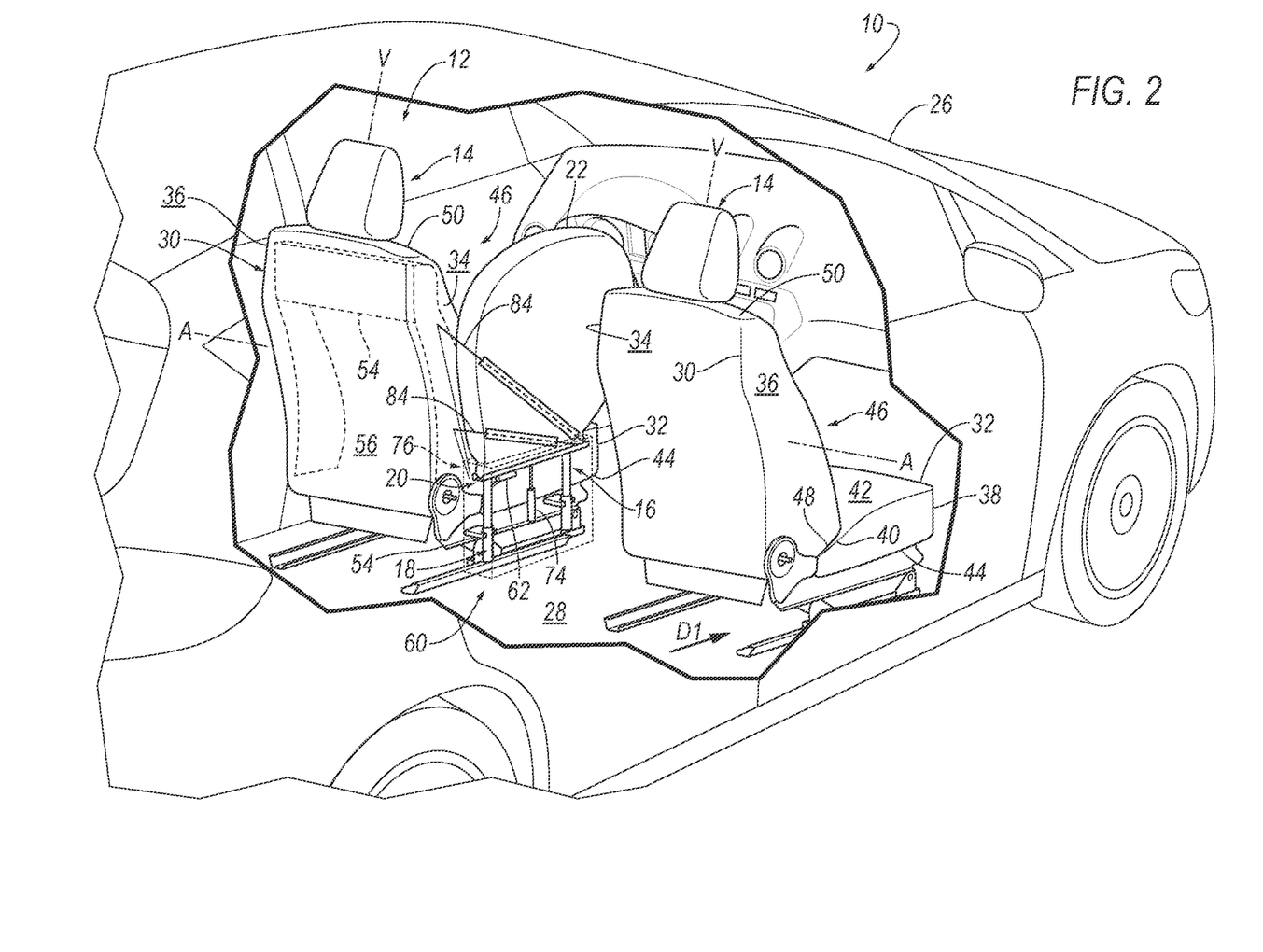
FIG. 2 is a perspective view of the vehicle including the restraint system having the airbag in an inflated position.
Figure 3A:
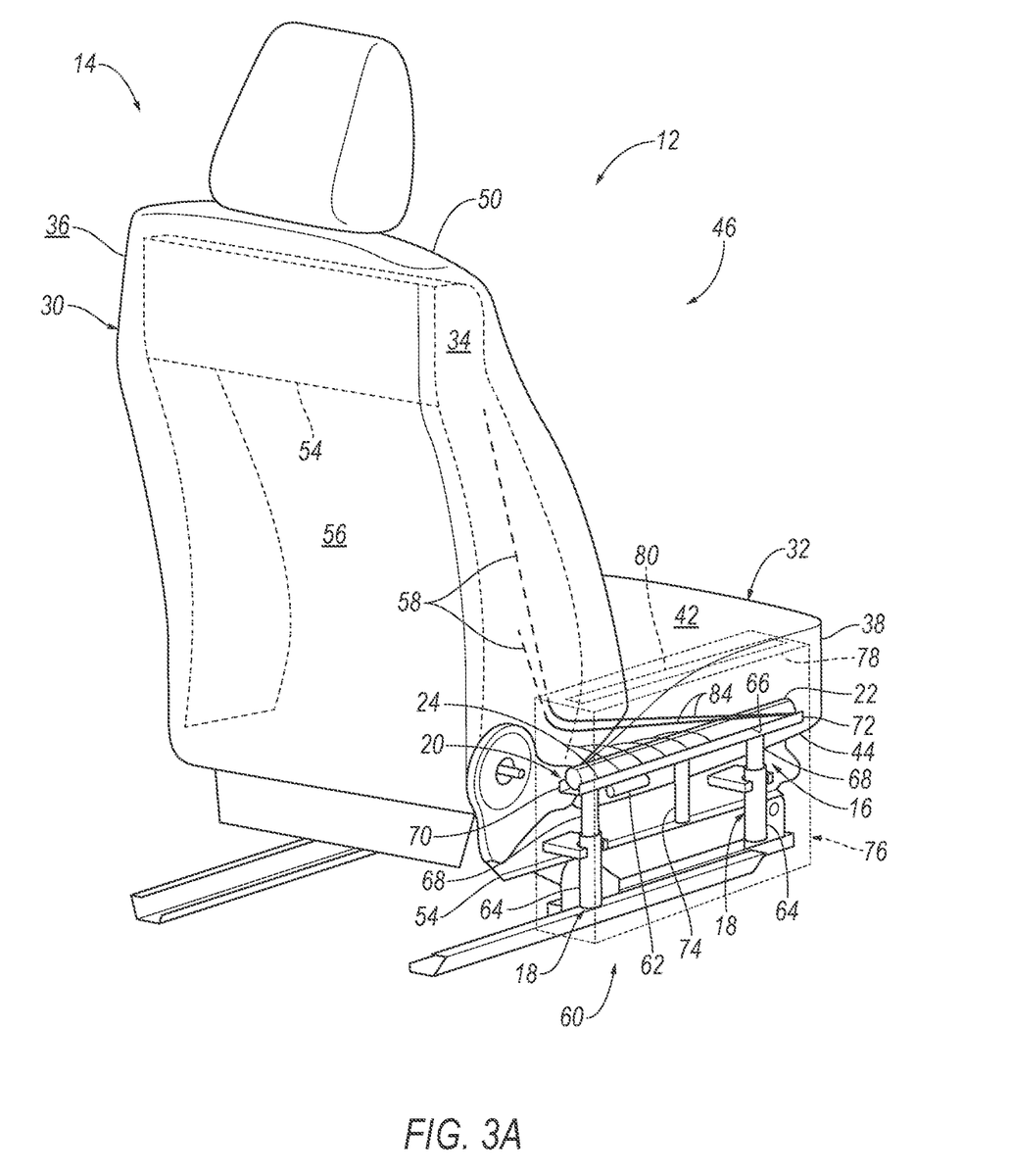
FIG. 3A is a magnified view of the restraint system of FIG. 1.
Figure 3B:
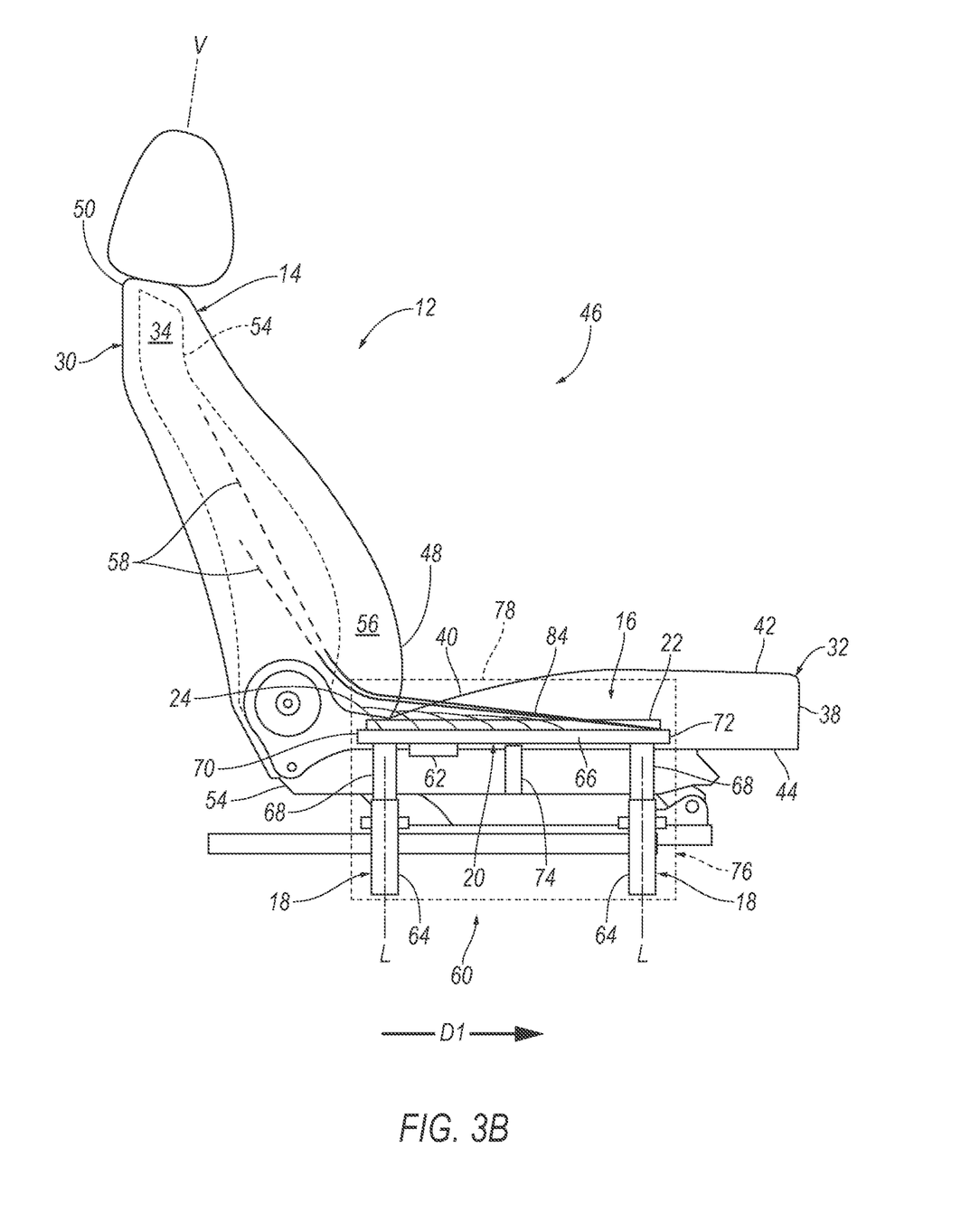
FIG. 3B is a side view of the restraint system of FIG. 3A.
Figure 4A:
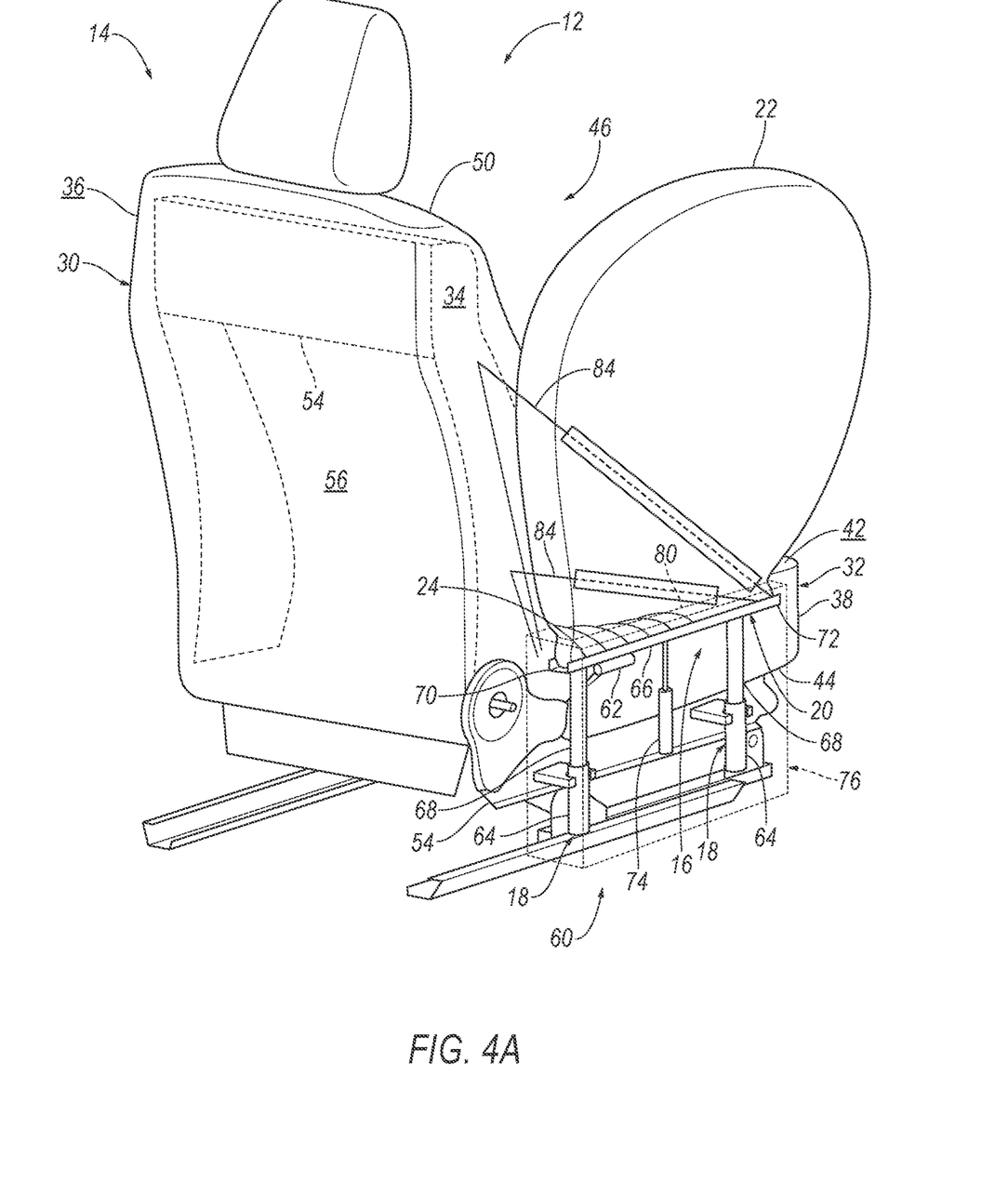
FIG. 4A is a magnified view of the restraint system of FIG. 2.
Figure 4B:
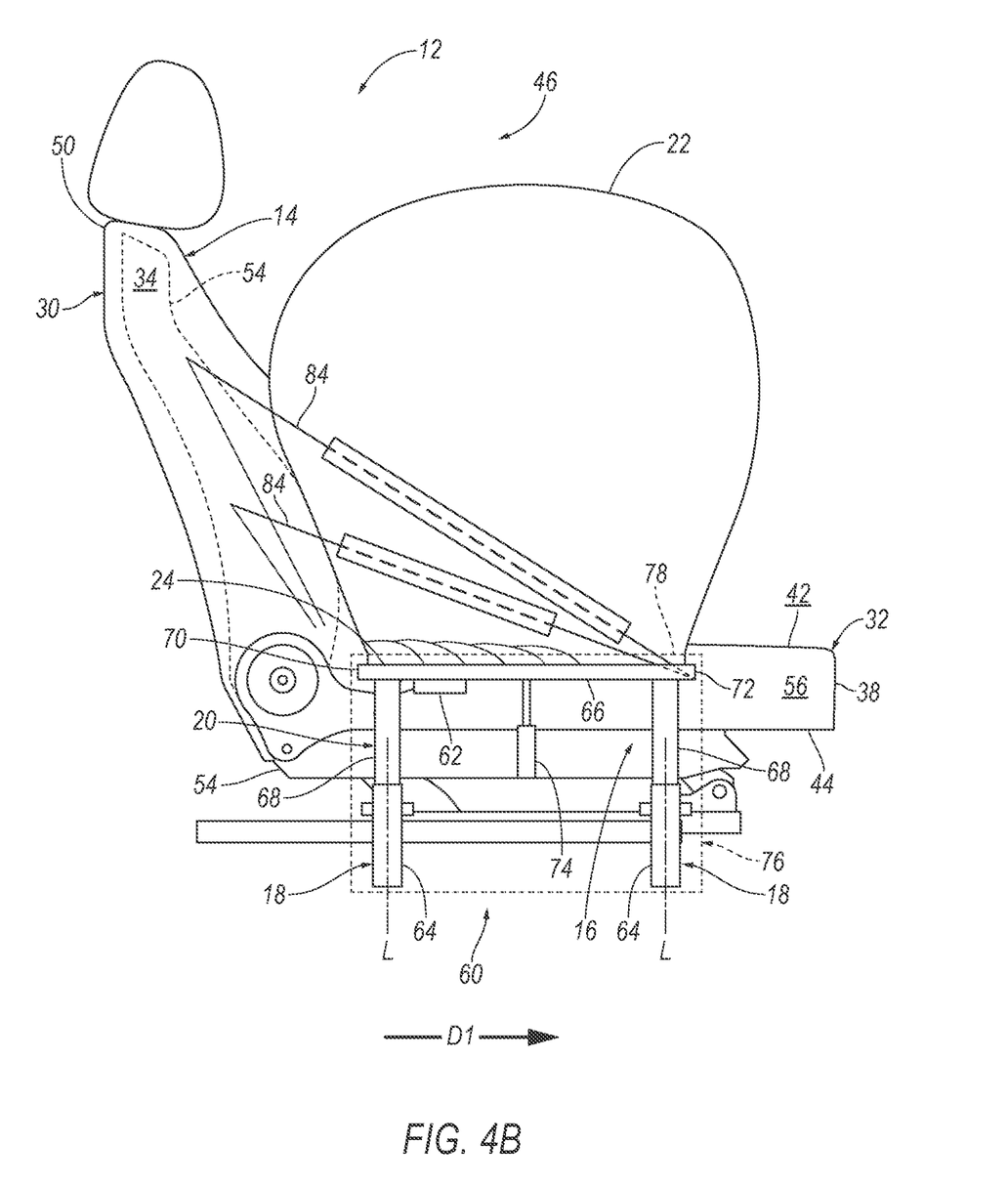
FIG. 4B is a side view of the restraint system of FIG. 4B.

The vehicle 10 may lack components, e.g., a center console, alongside the seat 14, e.g., to allow occupants to move within the vehicle 10. In other words, the vehicle 10 may lack a reaction surface alongside the seat 14 for the airbag 22. During a vehicle impact, the airbag 22 may be inflated from an uninflated position, as shown in FIGS. 1, 3A-3B, to an inflated position, as shown in FIGS. 2, 4A-4B. Additionally, the lifter 20 may be moved upwardly from an undeployed position, as shown in FIGS. 1, 3A-3B, to a deployed position, as shown in FIGS. 2, 4A-4B. During the vehicle impact, an occupant of the seat 14 may be forced into the airbag 22 in the inflated position. The airbag 22 may provide coverage so as to control the kinematics of the occupant, e.g., a torso of the occupant. By moving the lifter 20 upwardly in response to the vehicle impact, the restraint system 12 may position the airbag 22 to increase the likelihood that the airbag 22 provides coverage to control the kinematics of the occupant regardless of whether another component is adjacent to the seat 14 to provide a reaction surface for the airbag 22.

With reference to FIGS. 1-2, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a body 26 defining a passenger cabin (not numbered) to house occupants, if any, of the vehicle 10. The body 26 may include a roof (not numbered) and a floor 28 with the roof defining an upper boundary of the passenger cabin and the floor 28 defining a lower boundary of the passenger cabin. The body 26 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat, and/or one or more of the seats 14 may be at the rear end of the passenger cabin, i.e., a rear seat.

With continued reference to FIGS. 1-2, each seat 14 may include a seatback 30 and a seat bottom 32. The seatback 30 may be supported by the seat bottom 32 and may be stationary or movable relative to the seat bottom 32. The seatback 30 and the seat bottom 32 may be adjustable in multiple degrees of freedom. Specifically, the seatback 30 and the seat bottom 32 may themselves be adjustable, in other words, adjustable components within the seatback 30 and/or the seat bottom 32 may be adjustable relative to each other.

Each seat 14 defines a lateral axis A and a vertical axis V transverse to the lateral axis A. Each seat includes two sides 34, 36 spaced from each other along the lateral axis A. The sides 34, 36 extend along the seatback 30 and the seat bottom 32. The sides 34, 36 may support an occupant laterally relative to the seat 14. As one example, one of the sides 34, 36 may be an outboard side 34, and the other of the sides 34, 36 may be an inboard side 36 (with "inboard" and "outboard" referring to the relative position of the sides in a cross-vehicle direction). In such an example, the outboard side 34 is between the inboard side 36 of the seat 14 and the adjacent door.

As shown in the Figures, the seat bottom 32 includes a front end 38 and a back end 40. The seatback 30 is at the back end 40. The front end 38 is spaced from the back end 40 and the seatback 30. The seatback 30 extends across the seat bottom 32, e.g., from one side 34 of the seat 14 to the other side 36 of the seat 14, at the back end 40.

The seat bottom 32 includes a top 42 and a bottom 44 spaced from the top 42 and the seatback 30 along the vertical axis V. For example, the top 42 of the seat bottom 32 may be adjacent to the seatback 30 and the bottom 44 of the seat bottom 32 may be adjacent to the floor 28. The top 42 faces an occupant seating area 46 of the seat 14. The occupant seating area 46 is the area occupied by an occupant when seated on the seat bottom 32.

The seatback 30 includes a bottom 48 at the seat bottom 32 and a top 50 spaced from the bottom 48 and the seat bottom 32 along the vertical axis V of the seat 14. For example, the top 50 may support a head restraint (not numbered), i.e., be disposed between the head restraint and the seat bottom 32. The seatback 30 includes a front that faces the occupant seating area 46 of the seat 14.

With continued reference to FIGS. 1-2, each seat 14 defines a seat-forward direction D1. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. As another example, the seat bottom 32 may extend from the seatback 30 in the seat-forward direction D1.

Each seat 14 is supported by the floor 28, as shown in FIGS. 1-2. Each seat 14 may slide relative to the floor 28, e.g., in the seat-forward direction D1 or a seat-backward direction. In such an example, the seat 14 may be supported on a seat track (not shown) to allow the seat 14 to move in the seat-forward direction D1 or the seat-backward direction. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 28. In this situation, the seat 14 may be immovable relative to the floor 28.

With reference to FIGS. 3A and 4A, the seat 14 includes a seat frame 54. The seat frame 54 may include panels and/or may include tubes, beams, etc. The seat frame 54 may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

The seat 14 includes a covering 56 supported on the seat frame 54. The covering 56 may be cloth, leather, faux leather, or any other suitable material. The seat 14 may include padding material between the covering 56 and the seat frame 54. The padding material may be foam or any other suitable material. The covering 56 may be stitched in panels around the seat frame 54 and padding material.

With continued reference to FIGS. 3A and 4A, the seat 14, e.g., the covering 56, may include a tear seam 58. The tear seam 58 may be disposed on one side 34, 36 of the seat 14. For example, the tear seam 58 may be disposed on the inboard side 36 of the seat 14. The tear seam 58 may have any suitable shape. For example, the tear seam 58 may have a linear shape, i.e., extending in a line along the seat 14.

The tear seam 58 may be designed to tear apart when subjected to a tensile force above a threshold magnitude. In other words, the covering on one side of the tear seam 58 separates from the covering on the other side of the tear seam 58 when the force is above the threshold magnitude. The threshold magnitude may be chosen to be greater than forces from, e.g., inadvertent pushing against the seat 14 by an occupant but be less than forces from the deployment of the airbag 22. The tear seam 58 may be, for example, a line of perforations through the covering, a line of thinner covering material than the rest of the covering, etc.

With reference to FIGS. 3A-4B, the restraint system 12 includes a side airbag assembly 60, which includes the linear guide 16, the airbag 22, and an inflator 62. The seat 14 may support the side airbag assembly 60, and specifically, may support the airbag 22 when the airbag 22 is in the inflated position. The side airbag assembly 60 may be mounted to the seat 14, as discussed further below. The side airbag assembly 60 may be external to the covering 56 of the seat 14. In other words, the side airbag assembly 60 may be disposed alongside the seat 14, as shown in the Figures. More than one side airbag assembly 60 may be supported on the seat 14. For example, one side airbag assembly 60 may be supported on the inboard side 36 of the seat 14, as shown in the Figures. As another example, one side airbag assembly 60 may be supported on each side 34, 36 of the seat 14.

The linear guide 16 may be configured to limit movement of the lifter 20 to translation along the vertical axis V of the seat 14 relative to the base 18. That is, the linear guide 16 may be configured to restrict movement of the lifter 20 transverse to the vertical axis V. Said differently, the linear guide 16 may prevent the lifter 20 from pivoting relative to the base 18. The linear guide 16 may be of any suitable type and construction, e.g., a polymer, a composite, metal, etc.

The base 18 may be mounted to the seat frame 54 of the seat 14. For example, the base 18 may include locating elements, fastener, etc., that engage the seat frame 54 of the seat 14. Additionally, or alternatively, fasteners may engage the base 18 and the seat frame 54 of the seat 14 to mount the base 18 to the seat frame 54 of the seat 14.

With continued reference to FIGS. 3A-4B, the base 18 may include a cylinder 64 elongated along an axis L generally parallel to the vertical axis V of the seat 14. In this context, "generally" means that the axis L extends between the top 50 and the bottom 48 of the seatback 30 even if the axis L deviates from parallel. The cylinder 64 may extend annularly about the axis L. That is, the cylinder 64 may define a cavity extending along the axis L and circumferentially about the axis L. The base 18 may include any suitable number of cylinders 64. When the base 18 includes more than one cylinder 64, the cylinders 64 may be spaced from each other in the seat-forward direction D1, as shown in the Figures.

The lifter 20 houses the airbag 22 in the uninflated position. The airbag 22 may be folded and/or rolled in the lifter 20 when the airbag 22 is in the uninflated position, as shown in FIGS. 3A-3B. As described below, the airbag 22 expands from and is supported by the lifter 20 as the airbag 22 inflates from the uninflated position to the inflated position.

With reference to FIGS. 3B and 4B, the lifter 20 may include a crossmember 66 and an extension 68. The crossmember 66 may include a proximal end 70 and a distal end 72 spaced from the proximal end 70. For example, the crossmember 66 may be elongated along the seat-forward direction D1 from the proximal end 70 to the distal end 72. In other words, the longest dimension of the crossmember 66 is from the proximal end 70 to the distal end 72. The proximal end 70 may be adjacent to the back end 40 of the seat bottom 32, and the distal end 72 may be disposed between the proximal end 70 and the front end 38 of the seat bottom 32.

The extension 68 may extend along the axis L from the crossmember 66 towards the base 18, i.e., downwardly from the crossmember 66. The extension 68 may be fixed to the crossmember 66, e.g., via fasteners, welding, etc. Alternatively, the extension 68 and the crossmember 66 may be unitary, i.e., a single continuous piece.

The extension 68 may be received in the cavity of the cylinder 64. The extension 68 may be slidable within the cylinder 64. That is, the linear guide 16 may be telescopic. The extension 68 may be sized to be slidable within the cylinder 64. For example, an outer diameter of the extension 68 may be smaller than the diameter of the cavity. The cylinder 64 may include a stop that engages a lip on the extension 68 to stop relative sliding of the extension 68. The lifter 20 may include any suitable number of extensions 68, e.g., one for each cylinder 64.

The lifter 20 is moveable from an undeployed position to a deployed position by a pyrotechnic actuator 74 (as described below). The lifter 20 is moveable along the axis L towards the top 42 of the seat bottom 32. For example, the extension 68 may slide relative to the cylinder 64 along the axis L from the undeployed position to the deployed position. That is, the crossmember 66 may be disposed closer to the base 18 when the lifter 20 is in the undeployed position, as shown in FIG. 3B, than when the lifter 20 is in the deployed position, as shown in FIG. 4B. The crossmember 66 is disposed below the top 42 of the seat bottom 32 when the lifter 20 is in the undeployed position. The crossmember 66 may be disposed below the top 42 of the seat bottom 32 when the lifter 20 is in the deployed position.

With reference to FIGS. 3A-4B, the pyrotechnic actuator 74 may be supported by the seat bottom 32. For example, the pyrotechnic actuator 74 may be mounted to the seat frame 54 of the seat bottom 32. For example, the pyrotechnic actuator 74 may include locating elements, fastener, etc., that engage the seat frame 54 of the seat 14. Additionally, or alternatively, fasteners may engage the pyrotechnic actuator 74 and the seat frame 54 of the seat 14 to mount the pyrotechnic actuator 74 to the seat frame 54 of the seat 14. Additionally, the pyrotechnic actuator 74 is connected to the lifter 20, e.g., between the proximal and distal ends 70, 72 of the crossmember 66. As an example, a rigid bar may extend from the pyrotechnic actuator 74 to the lifter 20, e.g., the crossmember 66. The rigid bar may be connected to the lifter 20, e.g., via fasteners, welding, etc.

Figure 5:
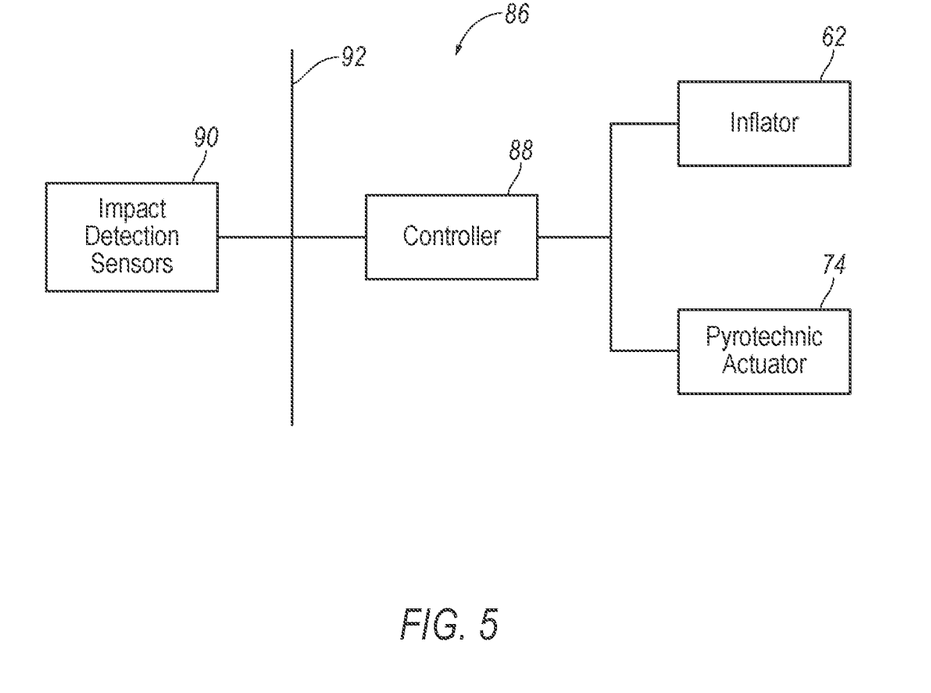
FIG. 5 is a block diagram of an inflation system of the vehicle.

The pyrotechnic actuator 74 is configured to push the lifter 20 to the deployed position. That is, the pyrotechnic actuator 74 is operable to push the lifter 20 toward the top 42 of the seat bottom 32, i.e., upwardly along the axis L. Specifically, the pyrotechnic actuator 74 is positioned such that the pyrotechnic actuator 74 extends along the axis L. The pyrotechnic actuator 74 is actuated in response to a vehicle impact, as discussed below. Since the pyrotechnic actuator 74 is connected to the lifter 20 by the rigid bar, the pyrotechnic actuator 74 pushes the lifter 20 along the axis L, as shown in FIGS. 4B and 5B. The pyrotechnic actuator 74 may linearly extend the rigid bar. The pyrotechnic actuator 74 is configured to push the lifter 20 towards the top 42 of the seat bottom 32. When the pyrotechnic actuator 74 extends the rigid bar, the rigid bar transmits a force to push the lifter 20, which extends the lifter 20 along the axis L.

The pyrotechnic actuator 74 in FIGS. 3A-4B is pyrotechnically actuated. The pyrotechnic actuator 74 may be any actuator that ignites a combustible material. For example, the pyrotechnic actuator 74 may include a pyrotechnic charge that produces gas or otherwise rapidly expands upon actuation. Specifically, the pyrotechnic actuator 74 may include a cylinder and a piston and pyrotechnic charge in the cylinder. The piston is connected to the rigid bar and the pyrotechnic charge is ignited to slide the piston along the cylinder, i.e., moving the piston and the rigid bar relative to the seat frame 54 of the seat bottom 32. In response to a vehicle impact, as discussed further below, the pyrotechnic charge detonates to move the piston. The pyrotechnic actuator 74 may, for example, be actuated simultaneously to the inflation of the airbag 22. As another example, the pyrotechnic actuator 74 may be actuated prior to the inflation of the airbag 22.

With reference to FIGS. 3A-3B, the side airbag assembly 60 may include a cover 76. The cover 76 may enclose the linear guide 16, the inflator 62, and the airbag 22 in the uninflated position. The cover 76 may include a top 78 spaced from the floor 28. For example, the top 78 of the cover 76 may be disposed between the floor 28 and the top 42 of the seat bottom 32. The cover 76 may include a slit 80 extending through the top 78 of the cover 76. The slit 80 may be elongated along the top 78 of the cover 76 in the seat-forward direction D1. The slit 80 may be spaced from the airbag 22 in the uninflated position along the vertical axis V. The airbag 22 extends through the slit 80 in the inflated position. The lifter 20 may be disposed closer to the slit 80 in the deployed position than in the undeployed position.

The cover 76 may present a class-A surface, e.g., a finished surface exposed to view by a customer and free of unaesthetic blemishes and defects. The cover 76 may be of any suitable type and construction, e.g., a plastic, a composite, etc.

As set forth above, the mounting connection 24 of the airbag 22 is supported by and fixed to the lifter 20. The mounting connection 24 is a point of attachment between the airbag 22 and another component, e.g., the lifter 20. The mounting connection 24 may include, e.g., clips, panels, stitching, fasteners, etc., for attaching the airbag 22 to another component. The airbag 22 may include any suitable number of mounting connections 24, e.g., one or more. For example, the airbag 22 can include a plurality of mounting connections 24. That is, the airbag 22 may be fixed to the lifter 20, e.g., the crossmember 66, at a plurality of points. For example, the airbag 22 may include a plurality of mounting connections 24 along the crossmember 66, i.e., between the proximal and distal ends 70, 72 of the crossmember 66. Mounting connections 24 may, for example, be spaced from each other in the seat-forward direction D1 along the lifter 20. As another example, mounting connections 24 may be adjacent each other such that the mounting connection 24 seal an inflation chamber of the airbag 22.

The mounting connection 24 may, for example, be directly between the airbag 22 and the lifter 20, e.g., the crossmember 66, via stitching, ultrasonic welding, etc. That is, the airbag 22 may be fixed directly, i.e., without intermediate components, to the lifter 20, as shown in FIGS. 4A-4B. As another example, the mounting connection 24 may be indirectly between the airbag 22 and the lifter 20. In such an example, the side airbag assembly 60 may include a housing (not shown) that may house the airbag 22 in the uninflated position and may support the airbag 22 in the inflated position. The airbag 22 may be fixed to the housing via one or more mounting connection 24, and the housing may be fixed to the lifter 20, e.g., the crossmember 66, via clips, panels, fasteners, etc. The housing may move as a unit with the lifter 20 when the pyrotechnic actuator 74 moves the lifter 20 to the deployed position, i.e., when the airbag 22 inflates. In other words, the housing may move relative to the seat 14 when the airbag 22 inflates.

The airbag 22 may be formed of any suitable airbag 22 material, e.g., from a woven polymer. For example, the airbag 22 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 22 may be a single continuous unit, e.g., a single piece of fabric. Alternatively, the airbag 22 may include a plurality of segments, i.e., two or more. The segments may be attached to each other in any suitable fashion, e.g., a plurality of panels attached by stitching, ultrasonic welding, etc.

As set forth above, the airbag 22 is inflatable from the uninflated position to the inflated position. In the uninflated position, the airbag 22 may be disposed in the cover 76, as shown in FIGS. 3A-3B. That is, the cover 76 may cover the airbag 22 in the uninflated position. The airbag 22 extends from the lifter 20 in the inflated position. Specifically, the airbag 22 extends through the cover 76, e.g., the slit 80, in the inflated position, as shown in FIGS. 4A-4B. In other words, the lifter 20 may support the airbag 22 in the inflated position. The airbag 22 may be disposed adjacent to the seatback 30 and the seat bottom 32 in the inflated position. In the inflated position, the airbag 22 extends along the occupant seating area 46, e.g., in the seat-forward direction D1 and along the vertical axis V of the seat 14 (as shown in FIG. 4B), between the occupant seating area 46 and another seat 14, i.e., inboard of the occupant seating area 46. In the inflated position, the airbag 22 may extend next to the occupant seating area 46 to control occupant kinematics.

With continued reference to FIGS. 3A-4B, the side airbag assembly 60 may include a plurality of external tethers 84 extending from the lifter 20 to the seatback 30. The external tethers 84 may be disposed outboard of the airbag 22 in the inflated position relative to the seat 14, i.e., the airbag 22 is disposed between the external tethers 84 and the seat 14. The side airbag assembly 60 may include any suitable number of external tethers 84. The external tethers 84 may be any suitable material. For example, the external tethers 84 may be a same material as the airbag 22.

The external tethers 84 may be attached to lifter 20 and the seatback 30, e.g., the seat frame 54. The external tethers 84 may be attached at any suitable location on the lifter 20. For example, the external tethers 84 may be attached to the distal end 72 of the crossmember 66, as shown in FIGS. 4A-4B. That is, the external tethers 84 may be attached directly to the lifter 20. As another example, the external tethers 84 may be attached indirectly to the lifter 20. For example, the restraint system 12 may include a pretensioner fixed to the lifter 20, e.g., the crossmember 66. In such an example, the external tethers 84 may be connected to a webbing that is engaged with the pretensioner. That is, one end of the webbing may be attached to the pretensioner and the other end of the webbing may be attached, e.g., via stitching, ultrasonic welding, etc., to the external tethers 84. Similarly, the external tethers 84 may be attached at any suitable location along the seatback 30. For example, the external tethers 84 may be attached to the seatback 30 between the top 50 and the bottom 48, as shown in FIGS. 4A-4B. The external tethers 84 may be attached to the lifter 20 and the seatback 30, e.g., via stitching, ultrasonic welding, etc.

Additionally, the external tethers 84 may be attached to the airbag 22. The external tethers 84 may be attached to the airbag 22 along an axis defined by the external tether 84 and extending from the lifter 20 to the seatback 30. The external tethers 84 may be attached to the airbag 22, e.g., via stitching, ultrasonic welding, etc. In such an example, the airbag 22 may pull the external tethers 84 out of the seatback 30 during inflation of the airbag 22. As another example, the external tethers 84 may be disconnected from the airbag 22. In such an example, the external tethers 84 may be engaged with the pretensioner, as discussed above. In this situation, the pretensioner may be actuated, e.g., simultaneously with the pyrotechnic actuator 74, to retract the webbing during inflation of the airbag 22, which transfers a force to the external tethers 84 to pull the external tethers 84 through the tear seam 58. The pretensioner may be any suitable type such as a piston linkage, in which an explosive charge drives a piston attached to a cable; a ball-in-tube linkage, in which an explosive charge propels a ball or balls over a cogwheel connected to a cable; a mechanical linkage, in which a compressed spring attached to a cable is released; a rack and pinion linkage, in which an explosive charge propels a toothed rack bar to mesh with a gear connected to a cable, or any other suitable type.

The external tethers 84 may be uninflatable. In other words, the external tethers 84 may not define an inflation chamber, e.g., the external tethers 84 may be a panel of material that is not fixed to another panel, or itself, to enclose a volume for receiving inflation medium. The external tethers 84 may be a woven fabric, or any other suitable material.

When the airbag 22 is in the uninflated position, the external tethers 84 may extend through the slit 80 of the cover 76 and into the seat 14, as shown in FIG. 3A. That is, the external tethers 84 may be partially disposed inside the seat 14, i.e., covered by the covering 56 of the seat 14. The external tethers 84 may, for example, extend along the seatback 30 and the seat bottom 32 when the airbag 22 is in the uninflated position. During inflation, the airbag 22 pulls the external tethers 84, e.g., through the tear seam 58, out of the seat 14.

The external tethers 84 may be under tension when airbag 22 is inflated. In other words, the external tethers 84 may be taught, i.e., not relaxed, when the airbag 22 is inflated. By tensioning the external tethers 84, the external tethers 84 may be a reaction surface for the airbag 22. That is, the external tethers 84 may provide a counteracting force against the airbag 22 when the airbag 22 is impacted by the occupant. In such an example, the external tethers 84 may provide lateral support for the airbag 22, which may assist the airbag 22 in controlling occupant kinematics.

The inflator 62 is in fluid communication with the airbag 22. The inflator 62 expands the airbag 22 with inflation medium, such as a gas, to move the airbag 22 from the uninflated position to the inflated position. The inflator 62 is supported by the lifter 20 and enclosed by the cover 76. For example, the inflator 62 may be fixed to the crossmember 66, e.g., via fasteners, welding, etc.

The inflator 62 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 62 may be, for example, at least partially in an inflation chamber of the airbag 22 to deliver inflation medium directly to the inflation chamber or may be connected to the inflation chamber through fill tubes, diffusers, etc.

With reference to FIG. 5, the vehicle may include a control system 86. The control system 86 may include the controller 88, an impact detection sensor 90, the pyrotechnic actuator 74, and the side airbag assembly 60, e.g., the inflator 62, in communication through a communication network 92.

The impact detection sensor 90 may be in communication with the controller 88. The impact detection sensor 90 is programmed to detect an impact to the vehicle 10. The impact detection sensors 90 may be of various types, e.g., pressure sensor, acceleration sensor, vision sensor, etc. The impact detection sensor 90 may be located at numerous points in or on the vehicle 10. When the vehicle impact occurs, the controller 88 may receive one or more signals from the impact detection sensors 90 indicating the vehicle impact. In response to receiving the signals from the impact detection sensors 90, the controller 88 may initiate the inflation of the airbag 22. Alternatively, the controller 88 may initiate the inflation of the airbag 22 selectively based on information from the impact detection sensors 90 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats 14 sensing the occupancy status of the seats 14.

The controller 88 may be a microprocessor-based computing device implemented via circuits, chips, or other electronic components. The controller 88 may include a processor, memory, etc. The memory of the controller 88 may store instructions executable by the processor and the processor may read the instructions from the memory and execute the instructions.

The control system 86 may transmit signals through the communications network 92 such as a controller area network (CAN) bus, Ethernet, Local Interconnect Network (LIN), and/or by any other wired or wireless communications network.

The controller 88 may be programmed to actuate the pyrotechnic actuator 74 in response to detecting a vehicle impact. For example, in response to receiving the signals from the impact detection sensors 90, the controller 88 may initiate the ignition of the pyrotechnic actuator 74. In other words, when the impact detection sensors 90 detect a vehicle impact, the controller 88 may send a signal to ignite the pyrotechnic actuator 74. In this situation, the pyrotechnic actuator 74 discharges, which moves the lifter 20 upwardly along the vertical axis V to the deployed position, as set forth above.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 22 is in the uninflated position, under normal operating conditions of the vehicle 10. In the event of a vehicle impact, the impact detection sensors 90 detect the impact. The impact detection sensors 90 transmit a signal indicating the vehicle impact collision through the communication network 92 to the controller 88. When the vehicle impact is detected, the controller 88 transmits a signal through the communication network 92 triggering the inflator 62 to inflate the airbag 22 with inflation medium from the uninflated position to the inflated position. Additionally, the processor transmits a signal through the communication network 92 triggering the pyrotechnic actuator 74 to discharge to move the lifter 20 from the undeployed position to the deployed position. When the inflator 62 inflates the airbag 22 to the inflated position, the inflation medium flows into the inflation chamber of the airbag 22, increasing the pressure in the inflation chamber. As the pressure is increased in the inflation chamber, the airbag 22 extends through the slit 80 to the inflated position. As the occupant moves relative to the seat 14 due to momentum of the vehicle impact, the occupant moves towards the airbag 22 in the inflated position. When the occupant impacts the airbag 22, the airbag 22 controls the kinematics of the occupant. By moving the lifter 20 upwardly in response to the vehicle impact, the restraint system 12 may position the airbag 22 to control the kinematics of the occupant regardless of whether another component is adjacent to the seat 14 to provide a reaction surface for the airbag 22.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
a seat defining a vertical axis;
a linear guide adjacent the seat, the linear guide having a base fixed relative to the seat and a lifter moveable relative to the base along the vertical axis; and
an airbag having a mounting connection, the mounting connection being supported by and fixed to the lifter of the linear guide;
wherein the linear guide is telescopic; and
wherein the seat includes a seat bottom having a top and a bottom spaced from the top, the lifter being disposed between the top and the bottom in an undeployed position and a deployed position.

2. The restraint system of claim 1, wherein the linear guide being configured to restrict movement of the lifter transverse to the vertical axis.

3. The restraint system of claim 1, further comprising a pyrotechnic actuator supported by the seat and engaged with the lifter, the pyrotechnic actuator positioned to move the lifter upwardly relative to the seat from an undeployed position to a deployed position.

4. The restraint system of claim 3, further comprising a processor and a memory storing instructions to actuate the pyrotechnic actuator in response to detecting a vehicle impact.

5. The restraint system of claim 1, wherein the seat includes a seatback defining an occupant seating area, the airbag extends from the lifter along the occupant seating area in an inflated position.

6. The restraint system of claim 1, further comprising a plurality of external tethers extending from the lifter to the seat.

7. The restraint system of claim 6, wherein the external tethers extend along the seat bottom and the seatback when the airbag is uninflated.

8. The restraint system of claim 6, wherein the external tethers are attached to the seat and the lifter, the external tethers being under tension between the seat and the lifter when the airbag is in an inflated position.

9. The restraint system of claim 6, wherein the airbag in an inflated position is disposed between the external tethers and the seat.

10. The restraint system of claim 6, wherein the external tethers are a reaction surface for the airbag in an inflated position.

11. The restraint system of claim 6, wherein the external tethers are fabric and uninflatable.

12. The restraint system of claim 1, wherein the linear guide is supported by the seat.

13. The restraint system of claim 1, further comprising a cover supported by the seat, the cover enclosing the lifter and the base.

14. The restraint system of claim 13, wherein the cover includes a slit disposed adjacent to the airbag, and the airbag extends through the slit in an inflated position.

15. The restraint system of claim 13, wherein the cover is disposed alongside the seat.

16. The restraint system of claim 13, further comprising an inflator in fluid communication with the airbag, wherein the cover encloses the inflator.

17. A restraint system comprising:
a seat;
a linear guide adjacent the seat, the linear guide having a base fixed relative to the seat and a lifter moveable relative to the base;
an airbag having a mounting connection, the mounting connection being supported by and fixed to the lifter of the linear guide; and
a cover supported by the seat, the cover enclosing the lifter and the base.

18. A restraint system comprising:
a seat;
a linear guide adjacent the seat and supported by the seat, the linear guide having a base fixed relative to the seat and a lifter moveable relative to the base; and
an airbag having a mounting connection, the mounting connection being supported by and fixed to the lifter of the linear guide;
wherein the linear guide is telescopic.

* * * * *